July 24, 1951  W. P. MURPHY  2,561,748
BATTERY ELECTROLYTE LEVEL INDICATOR
Filed Feb. 14, 1950
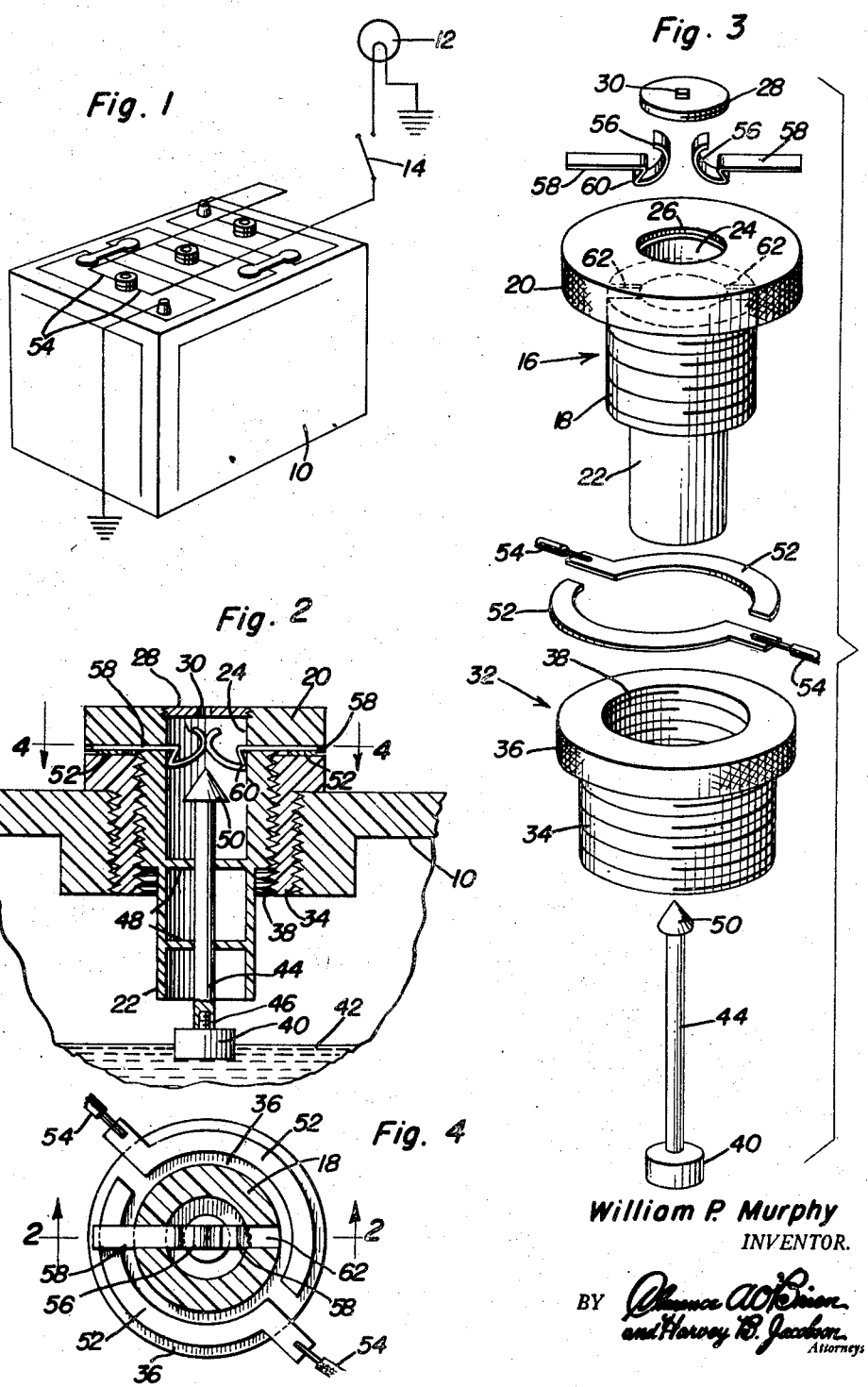
William P. Murphy
INVENTOR.

Patented July 24, 1951

2,561,748

UNITED STATES PATENT OFFICE 2,561,748

BATTERY ELECTROLYTE LEVEL INDICATOR

William P. Murphy, Romulus, Mich., assignor of twenty per cent each to Gasper A. Bertolino, Melvindale, and Robert L. Bowden, Erwin W. Froehlich, and Patrick G. Hancock, all of Detroit, Mich.

Application February 14, 1950, Serial No. 144,071

3 Claims. (Cl. 136—182)

This invention relates generally to signal devices and more particularly to a battery electrolyte level indicator for use in storage batteries, and still more particularly to that part of such a system as is secured in the battery filler opening.

A primary object of this invention is to provide means for informing the operator of a motor vehicle, or the operator of any other device involving the use of a storage battery, with regard to the level of the electrolyte in the battery.

Another object of this invention is to provide a plug assembly operating as a filler opening cap as well as a device for making and breaking an electrical circuit, the plug assembly being removable after the manner of an ordinary filler opening cap.

Another object of this invention is to provide a plug assembly as mentioned above, wherein the means for breaking and making a circuit is operated by a float, which float is prevented from disassembly from the remaining portions of the plug assembly when such assembly is removed from the battery, as in testing and replacement of water, the plugs being also designed with a view to easy assembly of the various parts.

Another object, closely allied to the preceding objects, is to provide a plug assembly in which the elements or parts thereof are individually replaceable as required.

And a last object to be mentioned specifically is to provide a plug assembly of the type mentioned above which is relatively inexpensive to manufacture, which is safe, simple and convenient to install and use, and which will give generally efficient and durable service.

With these and other objects definitely in view, this invention resides in certain novel features of construction, combinations and arrangements of elements and portions as will hereinafter be described in detail in the specification, particularly pointed out in the appended claims, and illustrated in the accompanying drawings which form a material part of this application, and in which:

Figure 1 is a diagrammatic view showing a complete installation, wherein a signalling device and a switch are operatively connected with plug assemblies in a storage battery;

Figure 2 is a vertical sectional view taken substantially upon the line 2—2 in Figure 4;

Figure 3 is an exploded view of the plug assembly; and

Figure 4 is a horizontal sectional view, taken stantially upon the line 4—4 in Figure 2.

Similar characters of reference designate similar or identical elements and portions throughout the specification and throughout the different views of the drawings.

Referring now to the drawings in detail, this invention is adapted to be used with an environment including a storage battery of the type indicated at 10, and the installation will also include a signalling device such as a buzzer, bell, or lamp, as diagrammatically indicated at 12, together with a master switch 14 which can be opened by the operator when the signal of the low level of the electrolyte in a battery has been given and when he does not desire that the signal be continued.

The plug assembly includes the part which will be hereinafter referred to generally as the plug 16, which plug includes a body 18 of cylindrical shape and externally threaded, and an enlarged head 20 which will preferably have a knurled outer surface. The plug 16 also includes a downwardly protruding portion 22, and the complete plug has a vertical axial bore 24 of uniform diameter. The top portion of the bore 24 may be threaded as at 26 to receive a dust cap 28 having a breather vent 30.

The plug assembly also includes an adapter vent cap generally indicated at 32, this cap having a cylindrical body portion 34 and an enlarged head 36 and the vent cap has a threaded bore 38 extending vertically therethrough and adapted to thread onto the externally threaded body portion 18 of the plug 16.

A float 40 of any suitable character will be used to ride upon the surface portion of the electrolyte 42 in the battery, and the float is provided with an upright stem 44 threadedly connected to the plug as indicated at 46. Guide means 48 comprising a pair of vertically spaced internal centrally apertured flanges disposed transversely of the bore 24 and integral with the plug 16 keep the float stem 44 in vertical position while allowing vertical movement of the float and stem. The stem 44 has an enlarged head 50 of non-conductive material and preferably of conical shape.

A pair of semi-circular conductors 52 comprising flat strips of metal are electrically connected to electrical wires 54 leading to terminals in the battery 10 and to the switch 14, when the device is used as illustrated in Figure 1, which assembly is considered the simplest and most practicable in implementing this invention. Electrical contacts 56 are constructed of spring metal and are preferably integral with shank portions 58 thereof, the contacts being similar and each arcuate with a heel portion 60 to comprise stops for limiting the insertion of the shanks 58 in slots 62 provided in the body 18 of the plug and diametrically disposed immediately beneath the head 20 of the plug. The contacts 56 and shanks 58 being constructed of strips of sheet metal, the slots 62 will be rectangular in cross-section, and it may be here noted that the slots may extend into the lower face of the head 20, although this is not necessary and is not illustrated in the drawing.

The operation of this invention will be clearly understood from a consideration of the foregoing description of the mechanical details thereof, taken in connection with the above recitation of the objects of this invention and the drawings, and further description would appear to be unnecessary.

In recapitulation, however, it should be noted that the plug has been designed for easy assembly and replacement of parts which may deteriorate faster than others. In assembly, the shanks 58 are inserted in the slots 62, with the heels 60 abutting the sides of the bore 24, after the stem 44 has been inserted through the apertures in the guide means 48. The float 40 is then attached, the conductors 52 inserted on one side of the shanks 58, and the adapter vent cap 32 screwed onto the threaded portion of the plug 16. The dust cap 28 is then added and the plug assembly is inserted in the filler opening of a battery 10 in the obvious manner. The head 50, ordinarily held up between the contacts 56 breaks the circuit through the signalling device 12 until such time as the level of the electrolyte 42 falls so as to lower the head 50, allowing the contacts 56 to engage. When this occurs, of course, the operator is informed of the low level of the electrolyte.

Having described the invention, what is claimed as new is:

1. In a storage battery electrolyte level indicator, a plug adapted to be mounted in a battery filler vent, conductors in said plug for connection in a circuit having a warning device, said conductors having contacts in electrical connection therewith and biased into mutual engagement, and an electrolyte operated float having a non-conductive stem normally separating said contacts, said plug having a vertical bore, and said contacts comprising strips of spring metal diametrically oppositely disposed in said bore, said stem being disposed between the contacts when the electrolyte is at a proper level, said plug comprising a body and an enlarged head, an adapter vent cap centrally apertured to receive said body, said plug having diametrically opposed slots, said contacts having shanks extending into said slots, said conductors comprising flat strips of metal, and said contact shanks and conductors being clamped between said head and on the upper end of said plug.

2. A device according to claim 1 and wherein said plug body is threaded into the bore of the vent cap.

3. A device according to claim 1 and wherein said float stem has an enlarged head, said stem being removable from said float, guide means for the stem in the bore of the plug, whereby assembly is facilitated and the bead on the stem prevents detachment of the stem and float from the remaining portions of the device during use.

WILLIAM P. MURPHY.

REFERENCES CITED

The following references are of record in the file of this patent:

UNITED STATES PATENTS

| Number | Name | Date |
| --- | --- | --- |
| 296,812 | Blake | Apr. 15, 1884 |
| 1,744,064 | Zagarind et al. | Jan. 21, 1930 |
| 1,963,123 | Flynn | June 19, 1934 |
| 2,033,279 | Flynn | Mar. 10, 1936 |
| 2,053,353 | Talbot | Sept. 8, 1936 |